No. 786,155. PATENTED MAR. 28, 1905.
J. R. ROGERS.
LINOTYPE MACHINE.
APPLICATION FILED OCT. 22, 1904.
3 SHEETS—SHEET 1.
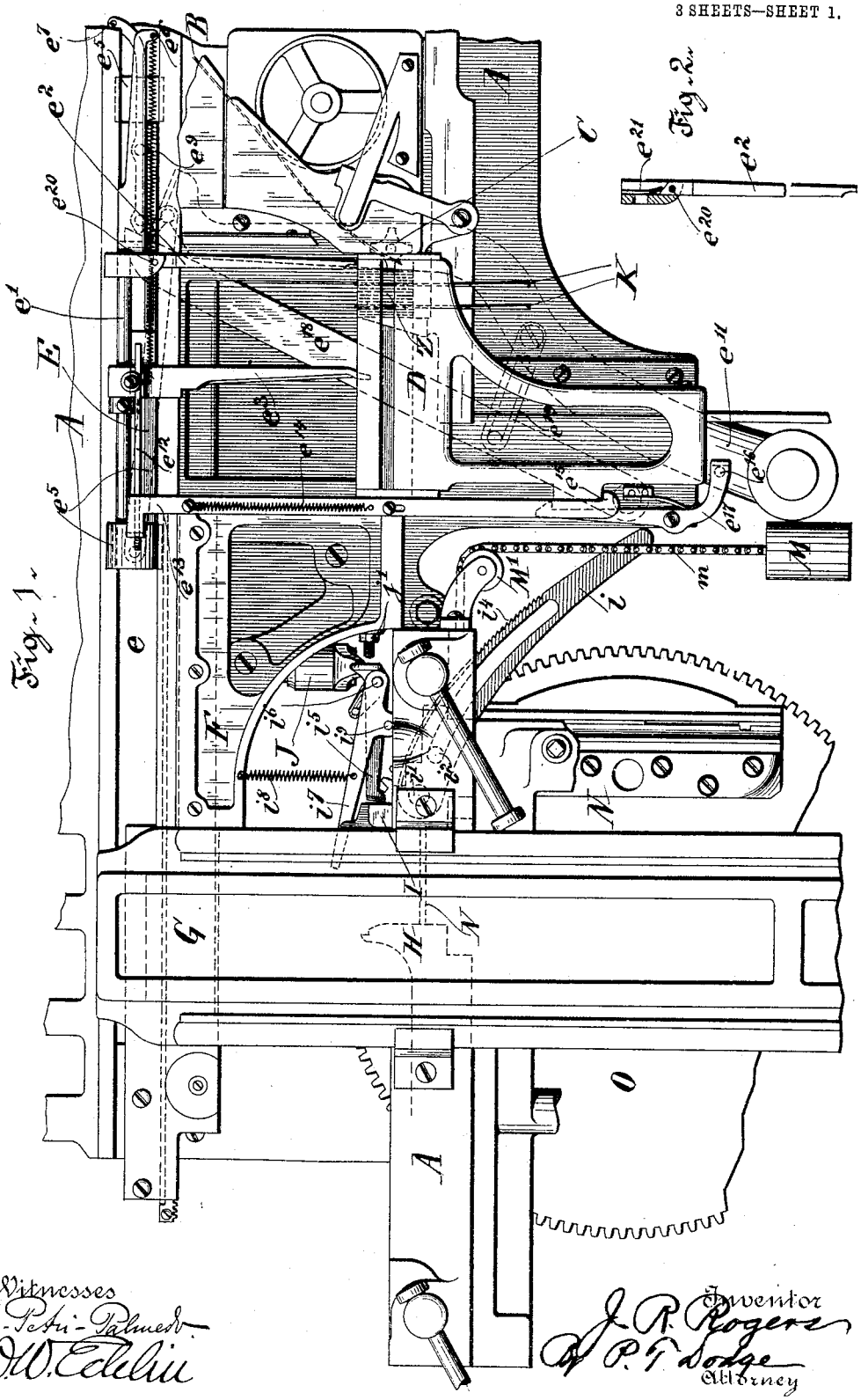

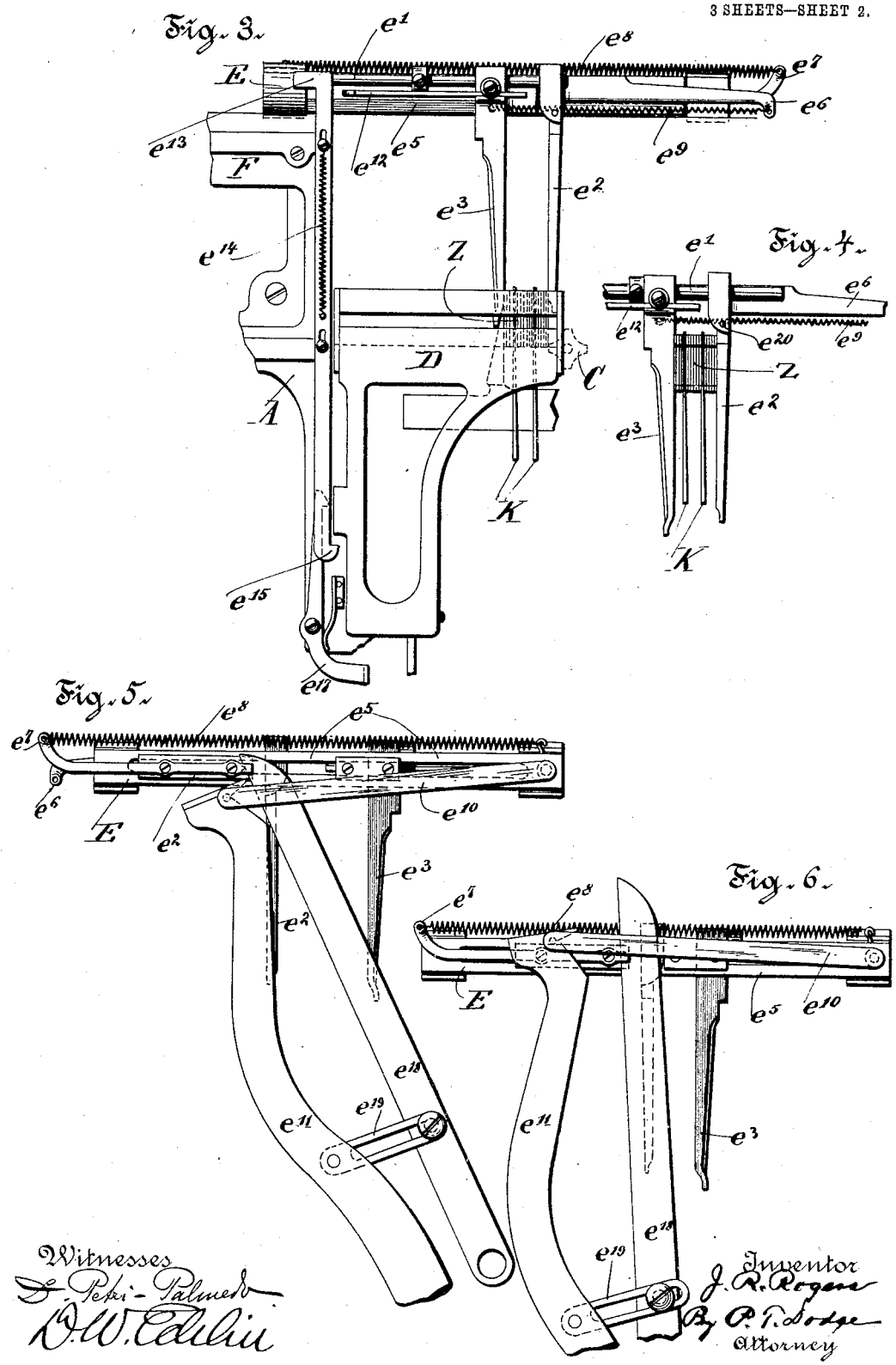

No. 786,155. PATENTED MAR. 28, 1905.
J. R. ROGERS.
LINOTYPE MACHINE.
APPLICATION FILED OCT. 22, 1904.
3 SHEETS—SHEET 3.
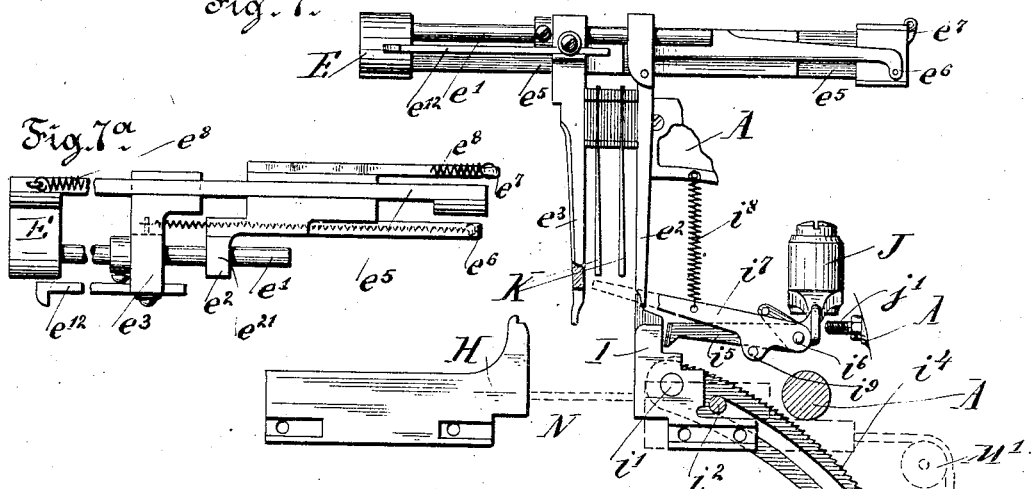
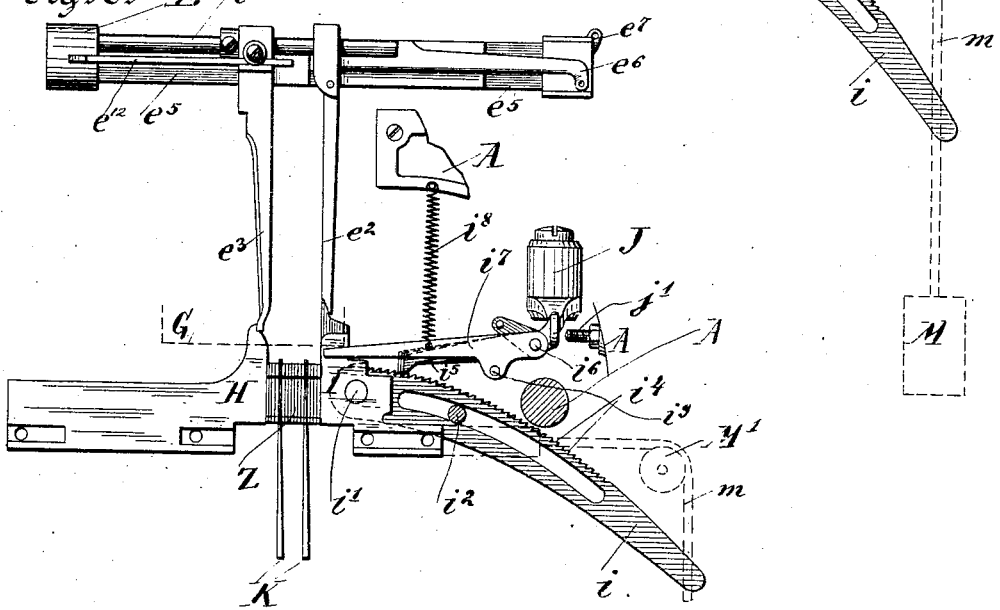
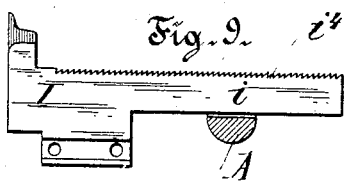
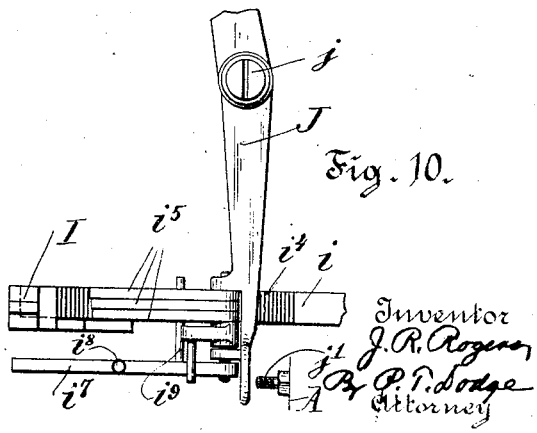

No. 786,155. Patented March 28, 1905.

UNITED STATES PATENT OFFICE.

JOHN R. ROGERS, OF BROOKLYN, NEW YORK, ASSIGNOR TO MERGENTHALER LINOTYPE COMPANY, A CORPORATION OF NEW YORK.

LINOTYPE-MACHINE.

SPECIFICATION forming part of Letters Patent No. 786,155, dated March 28, 1905.

Application filed October 22, 1904. Serial No. 229,862.

*To all whom it may concern:*

Be it known that I, JOHN R. ROGERS, of Brooklyn, county of Kings, and State of New York, have invented a new and useful Improvement in Linotype-Machines, of which the following is a specification.

My invention has reference to the Mergenthaler linotype and analogous machines wherein a linotype or line-printing bar is cast in a slotted mold against a composed line of matrices which is presented momentarily to the face of the mold, as represented, for example, in United States Letters Patent No. 436,532 to O. Mergenthaler. In the use of these machines in certain classes of work it is frequently necessary to produce slugs having only a small number of words or type characters at the forward end, the remaining portion being blank. In the use of the ordinary Mergenthaler machine the matrix-line is set or composed to the full length of the slug, blank matrices or quads being used to fill the space beyond the character-matrices. This "quadding out" of the line requires a corresponding manipulation of the keys and a consequent loss of time.

The aim of the present invention is to save the time thus lost by adapting the machine to automatically cover and close that portion of the mold which lies beyond the character-matrices, so that the operator after designating on the keys the few character-matrices required in the line may immediately send the matrix-line forward to the casting mechanism and proceed at once with the composition of the next line.

To this end the invention consists in means for automatically closing that portion of the mold which is not closed by matrices regardless of its length, to means for controlling the short matrix-lines varying in length and transferring them to the casting devices, to means for automatically preventing the action of the casting mechanism if the mold is not properly closed at the front, and to various other features, which will be hereinafter explained.

In the drawings I have represented my improvements as applied to a commercial linotype-machine of the general organization represented in Letters Patent Nos. 436,532 and 557,000. The drawings show only those parts which are immediately associated with my invention. The remaining parts may be of the ordinary or of any other suitable construction.

Figure 1 is a front elevation showing the assembling devices, the casting mechanism, and the intermediate transfer mechanism. Fig. 2 is an edge view of the rear finger for transferring the matrix-line, the upper end being shown in section. Fig. 3 is a front elevation of the assembling-elevator and transfer-carriage, with a composed line of matrices lifted slightly above the original or assembling level in its course to a higher level, on which it is transferred to the left toward the casting mechanism. Fig. 4 is a front elevation of the fingers of the transfer-carriage at a later stage of the operation with the matrix-line fully lifted and confined between the fingers in the manner in which it is held during transference. Fig. 5 is a rear view of the transfer-carriage and its operating-levers with the parts in the position shown in Fig. 1. Fig. 6 is a similar view of the carriage and operating-levers with the parts in the position shown in Fig. 4. Fig. 7 is a front view of the carriage, matrix-confining jaws, and attendant parts at the third step in the operation with the line transferred nearly to the point at which it is lowered to the mold. Fig. 7$^a$ is a plan view of the carriage and adjacent parts. Fig. 8 is a view of the parts shown in the two preceding figures at a later stage of action, the line being in its lower position between the jaws and in front of the mold. Fig. 9 is a front elevation of the automatically-closing jaw in a modified or equivalent form. Fig. 10 is a top plan view of the lever for controlling the casting mechanism and adjacent parts.

Referring to the drawings, A represents a stationary main frame; B, an inclined belt on which the matrices are received successively as they are delivered from the magazine; C, a star-shaped assembling-wheel in front of which the matrices are delivered and by which they are carried forward horizontally one at a time.

D is the assembling-elevator, channeled horizontally in its upper end to receive the matrices and the usual wedge spacers and support them side by side until the composition of the line is completed, this elevator being mounted, as usual, to slide vertically for the purpose of elevating the composed line to the transfer-carriage as its first step toward the casting mechanism.

E represents the horizontally-movable transfer-carriage, consisting of a slide mounted to travel in a horizontal groove or guide $e$ in the main frame and provided with a horizontal rod $e'$, carrying two depending fingers $e^2$ and $e^3$ to grasp and transfer the composed line after it has been lifted to the level shown in Fig. 4 by the rise of the assembling-elevator D.

F is a portion of the main frame commonly known as the "intermediate channel," its upper side containing a horizontal groove or channel through which the line of matrices is transferred from the elevated assembler D into the "first elevator" G, sometimes known as the "line-elevator," by means of the traveling fingers $e^2$ and $e^3$ of the transfer-carriage. The elevator G has a vertical motion and is slotted vertically, so that the fingers $e^2$ and $e^3$ may enter and carry the matrices upon the usual sustaining-shoulders therein.

H and I represent two opposing jaws mounted in the main frame for the purpose of confining the composed line of matrices between them in front of the mold during the casting operation. The matrix-line is lowered between these jaws by the descent of the first elevator G, which by reason of its being slotted, as before described, is adapted to straddle the jaws while seating the line between them.

N is the slotted mold in which the slug or linotype in cast. It is secured in a vertical intermittingly-revolving wheel or disk O, and at the time of the casting operation it stands in the horizontal position indicated by dotted lines in Fig. 1, so that its slot or mold-cell is presented in proper relation to the matrix-line.

In their general construction and operation the foregoing parts are similar to those used in the ordinary linotype-machine, the matrices after use at the mold being raised by the elevator G above their assembling level and transferred, through distributing mechanism, to the upper end of the magazine, as usual.

In the operation of the machine as ordinarily constructed the line-confining jaws H and I are always separated a distance equal to the length of the mold and the slug to be cast therein, and if the matrices representing the characters or letters form only a short line the remainder of the line is filled out by calling into use blank matrices or quads, as hereinbefore referred to. The object of my invention is to avoid the necessity for calling into action the blank quads or spaces, and to this end I construct the parts so that the short line of character-matrices may be transferred to the operative position in front of the mold and the right-hand jaw I automatically advanced toward its companion a suitable distance to tightly confine the character-matrices and cover and close that open portion of the front of the mold which extends beyond the matrices. To this end the jaw I is mounted to slide horizontally in the main frame, so that it may be advanced any desired distance toward its opponent, H, as shown in Figs. 7 and 8, and the face of the jaw is adapted to fit tightly against and close that portion of the mold, be it more or less, which is not covered and closed by the matrix-line. For the purpose of closing the mold the jaw may be constructed, as shown in Figs. 1, 7, and 8, with an extension or tailpiece $i$, pivoted thereto at $i'$ and guided by a fixed pin $i^2$, extending through a slot therein, or otherwise suitably guided, so that as the jaw I advances to the left to confine the matrix-line the tailpiece will be brought into position to cover and close the mold. Instead of providing the jaw with a pivoted extension to close the mold it may be constructed in a straight form, as shown in Fig. 9, in one continuous piece, and in many cases this construction is preferable. The employment of the hinged tailpiece is advantageous mainly in those cases in which my attachments are to be applied to existing machines in which there are behind the jaw parts which would conflict with the tail of the jaw were it not hinged to fall below them.

It is not only necessary that the jaw I shall be advanced to confine the matrices after they have been presented in the casting position, but also necessary that it shall be supported or locked in position during the justifying and casting action and that it shall thereafter be unlocked and automatically retracted that the matrix-line may be lifted for presentation to the distributing mechanism. For the purpose of closing the jaw against the matrix-line I employ the finger $e^2$ of the transfer-carriage, which is arranged to engage behind an upward projection on the jaw I, as plainly shown in Figs. 1, 7, and 8. The finger $e^3$ is so formed as to straddle the projection on the jaw I and advance past the same without engaging it. When the carriage completes its movement to the left, transferring the matrix-line into the elevator G, the finger $e^2$ encounters the jaw I, as shown in Fig. 7, and pushes it forward to the position shown in Fig. 8. The rear extension of the jaw is provided on the upper edge with rigid teeth $i^4$, and as the jaw advances these teeth are engaged by pawls $i^5$, mounted on a pivot $i^6$ and serving to prevent the retreat of the jaw as the matrix-line is expanded or lengthened during its justification.

The pivot of the pawls $i^5$ may be fixed rigidly to the main frame; but I prefer to pivot them, as shown in Figs. 7, 8, and 10, to one end of the horizontal pump-stopping lever J, pivoted at $j$ to the main frame and arranged to bank at its outer end against a screw-stud $j'$ in the main frame. This lever will be connected, as in the ordinary commercial linotype-machine and as shown in Letters Patent No. 659,865, to devices for preventing the action of the metal-delivery pump if the matrix line is so short that a casting should not be taken therefrom. The lever stands normally away from the stud $j'$, as shown in Figs. 7, 8, and 10, and the two jaws H and I stand at a distance apart a little less than the length of the required line. When a line is expanded, the action of the justifying wedges or spacers K, elongating the line, causes it to force the jaw I and the lever J backward until the latter comes to a solid bearing against the stop $j''$, whereby the lever and the jaw are supported against further movement and the pump-controlling mechanism at the same time released in the ordinary manner to permit the casting action.

The jaw-locking pawls $i^5$ fall into engagement by gravity as the jaw advances; but they are lifted out of engagement to permit the retreat of the jaw and held normally out of engagement by means of the lever $i^7$, urged upward by a spring $i^8$ and carrying a lateral arm $i^9$, underlying all the pawls, so that when the arm $i^7$ rises the pawls are lifted and sustained by the arm $i^9$. When the elevator G lowers the line into position in front of the mold, it acts upon and depresses the arm $i^7$, thereby permitting the pawls to fall into engagement.

After the casting action the tightly-justified line is released endwise by a slight retreat of the second jaw H in the manner common in linotype-machines, and this is followed by the rise of the elevator G, which not only lifts the matrix-line, but at the same time releases the arm $i^7$, so that the pawls may rise and unlock the jaw I, that it may be retracted to its original position. Any suitable means may be used for retracting the jaw; but I prefer to employ, as shown in the drawings, a weight M, connected to the jaw I by a chain $m$ passing over a pulley M' on the main frame.

From the foregoing it will be understood that the horizontal advance of the carriage, with the composed line, serves to advance the jaw I, so that it will confine the line in front of the mold and at the same time close that portion of the mold which is not closed by matrices and that after the casting action the jaw is automatically released and retracted.

While the transfer-carriage, as before stated, is constructed and arranged to operate in a manner resembling that of the ordinary carriage, it contains certain peculiarities of construction which are of decided advantage and which will now be described.

As shown more particularly in Figs. 5, 6, 7, 7ª, and 8, $e^5$ represents the rigid body or frame of the carriage, slotted longitudinally to receive the upper ends of the fingers $e^2$ and $e^3$. The finger $e^2$ is formed with outwardly-extending arms $e^6$ and $e^7$. From the arm $e^7$ a spring $e^8$ is extended to the opposite end of the carriage-frame and serves to constantly urge the finger $e^2$ to the left. From the arm $e^6$ a spring $e^9$ is extended to the finger $e^3$ and tends to draw the finger $e^3$ toward the finger $e^2$. The carriage-frame $e^5$ is connected on the rear side, as shown in Figs. 5 and 6, by a link $e^{10}$ to the upper end of the usual carriage-shifting lever, which returns the carriage preparatory to the composition of the line to its extreme position on the right, as shown in Fig. 1, so that the finger $e^2$ stands above the star-wheel C, so that both the matrices and spacers descend on the right of this finger and under its lower end to the line in the assembler D.

During the assemblage of the line in order that it may elongate readily during composition it is desirable to hold the finger $e^3$ away from its companion, as shown in Fig. 1, a distance a little greater than the length of the required line. This is effected by providing the finger $e^3$ with a laterally-extending arm $e^{12}$, having at its left end a lip or projection which is engaged by a vertically-sliding latch-bar $e^{13}$, mounted on the main frame. The latch-bar $e^{13}$ is provided at the lower end with a shoulder $e^{15}$, extending beneath a shoulder on the assembling-elevator D. A spring $e^{14}$ is extended from the main frame to the latch-bar $e^{13}$ and tends constantly to lift the latter out of engagement. During the assemblage of the line the elevator D holds the latch down in engagement with arm $e^{12}$, thereby holding the finger $e^3$ away from its companion, as shown in Fig. 1. When the composition of the line is complete and the assembling-elevator is lifted as usual, it permits the latch-bar $e^{13}$ to rise under the influence of the spring, and thereby release the arm $e^{12}$ and finger $e^3$, which latter is immediately moved to the right toward its companion $e^2$, as shown in Fig. 3, so that the rising line of matrices Z will be closely confined between the fingers, as shown in Fig. 4. The rise of the assembler with the line sets in motion, as usual, devices for actuating the carriage-shifting lever $e^{11}$. To this lever I connect, as shown in Figs. 1, 5, and 6, an auxiliary lever $e^{18}$ by means of a slotted link $e^{19}$, which permits a limited amount of play or lost motion between the levers. The auxiliary lever $e^{18}$ acts upon the upper end of the finger $e^2$ in order to slide the same along the carriage to the right to its normal position shown in Figs. 1, 3, and 5 when the carriage is restored to the position therein shown. This restoration of the finger $e^2$ to its normal position is accompanied by its separation from the finger $e^3$, owing to the fact that the latter is arrested and held by the latch $e^{13}$ during the return movement of the carriage and finger $e^3$ to the right.

On the lever $e^{11}$ there is a pin $e^{16}$, which engages a spring-actuated latch $e^{17}$, pivoted to the main frame when the lever $e^{11}$ is in its extreme right-hand position—that is to say, when the carriage is in position to receive a line from the assembling-elevator. The latch, except in this position of the carriage-lever, hooks over a projection on the assembling-elevator D and prevents it from being lifted, thus avoiding the possibility of a collision between the carriage E during its return movement and a line in the assembling-elevator D.

The lever $e^{11}$ moves the carriage to the left, as usual, to a constant point, while the auxiliary lever $e^{18}$, having an independent movement, carries the two matrix-confining fingers along the carriage to the left and until the finger $e^3$ stands in line with the left-hand jaw H, as shown in Fig. 8, so that the line when lowered between the jaws, as in Fig. 8, will be guided directly downward and seated against the left end of the left jaw H. This seating of the line, which has yet to be expanded by justification, against the left jaw is advantageous, for the reason that the justification or elongation of the line is toward the right. It is found in practice that when the short line is seated against the left jaw, as distinguished from the right, justification occurs in a more satisfactory manner.

From the foregoing it will be understood that in the operation of my carriage when the composition of the line is completed the finger $e^3$ first advances toward its companion $e^2$ and after the line is presented between the fingers the carriage moves toward the left, while the two fingers, with the matrices between them, also move to the left in relation to the carriage until the left finger $e^3$ is in line with the left-hand jaw H. When the carriage is returned to its normal position at the right, the finger $e^2$ is carried to the right in relation to the carriage to the position shown in Fig. 1, while the finger $e^3$ is arrested in its travel and held at a distance from its companion, as shown in the same Figs. 1 and 5.

It is to be particularly noted that in the present machine the finger $e^2$ is made of practically the same length as the finger $e^3$ and that the two fingers are extended downward to the respective jaws, so that they form, as shown in Fig. 8, continuous guides for confining the matrix-line and directing the end matrices positively and smoothly between the jaws. In the machines of this form as heretofore constructed the finger $e^2$ terminated at some distance above the jaw I, leaving an intervening space or gap. During its descent the matrix-line was released at one end while passing this gap, and it sometimes happened that the end matrix would jar out of position, strike upon the jaw I, and fail to descend to its proper place.

In order that the long finger $e^2$ may not interfere with the free descent of the matrices or space-bands to the line in the assembler D, as usual, I propose to form the finger, near its upper end, with a knuckle joint or hinge, as clearly shown in Figs. 1, 2, 3, 4, &c., in which $e^{20}$ represents the pivot-pin. The finger thus constructed is free to swing to the left, so that it will not offer any resistance to the matrices or spacers descending on the right. As shown in Fig. 2, a feeble spring $e^{21}$ may be arranged to act on the upper end of the finger in order to insure its return to a vertical position, so that it will stand on the right of the matrix-line, as shown in Fig. 3, when the latter is lifted. It is found that the long finger $e^2$, adapted to yield to the left and terminating immediately over the point at which the matrices and spacers enter the line, aids materially in directing them downward properly into the line and in preventing them from being accidentally thrown forward over the top of the line, as occasionally happens in the ordinary machines having a short unyielding finger at this point.

Having described my invention, what I claim is—

1. In a linotype-machine, the combination of a line-transfer carriage, two line-confining jaws, one of which is moved toward the other by the advance of the carriage, and means for locking the jaw.

2. In a linotype-machine, the combination of a line-transfer carriage, two line-confining jaws, one of which is advanced toward the other to its operative position by the carriage, means for transferring the line from the carriage to the casting position between the jaws, and means for locking the jaw during the casting action and thereafter retracting it.

3. In a linotype-machine, the combination of line-confining jaws normally separated beyond the working limit, line-transferring devices acting to set one jaw in operative relations to the other, the line-elevator, jaw locking and unlocking devices controlled by the line-elevator, and means for automatically retracting the jaw when unlocked.

4. In a linotype-machine, the combination of the normally open jaw to confine the matrix-line, the line-carrying finger acting to close the jaw, a pawl to lock the jaw when closed, spring connections tending to disengage the pawl, the line-elevator, means controlled by the line-elevator to throw the pawl into action, and means for retracting the jaw when the pawl is disengaged.

5. In a linotype-machine, the movable line-confining jaw having a toothed rear extension to cover the mold, in combination with means constantly tending to open the jaw, a locking device to hold the jaw closed, and means for automatically closing the jaw according to the varying length of the lines presented thereto.

6. In a linotype-machine and in combination with the line-confining jaw H, the movable, opposing, mold-covering jaw I, means tending constantly to retract the latter, and means for automatically locking it when it is advanced to its operative position.

7. In a linotype-machine, the line-confining jaw, provided with a hinged tail to cover and close the mold whereby the tailpiece is permitted, on the retreat of the jaw, to turn out of the path of the parts behind the jaw.

8. In a linotype-machine, a movable line-confining jaw, operative in different positions, in combination with a pump-stopping device and devices connecting the same with the jaw in the various positions of the latter.

9. In a linotype-machine, the sliding jaw and the pump-controlling lever, in combination with a pawl-and-ratchet connection between said parts.

10. In combination with the sliding toothed jaw and means tending constantly to retract or open the jaw, the pawl to hold the same forward, the arm $i^7$ adapted to lift the pawl out of action, the spring tending to raise the arm, and line-carrier G acting to depress the arm.

11. In combination with the jaw H and movable jaw I, the line-transferring carriage having two fingers arranged to engage the respective jaws.

12. The line-transferring carriage having the rigid and the hinged fingers, in combination with the normally fixed jaw engaging the rigid finger, and the normally open jaw engaged and moved by the hinged finger.

13. In a linotype-machine, adjustable devices to confine matrix-lines of different lengths, in combination with line-transferring devices arranged to automatically close the confining devices to suit the length of each line.

14. In a linotype-machine, the combination of two confining-jaws for the matrix-line, a line-transfer carriage having two fingers which connect with the inner ends of the jaws, and means for lowering the line between the fingers to its place between the jaws, whereby the line is confined and held in close order as it enters between the jaws.

15. In a linotype-machine, the two jaws and two matrix-guiding fingers arranged to connect with and form continuations of the inner ends of the jaws, whereby they are adapted to confine and guide the entering line.

16. The line-transfer carriage provided with a hinged finger arranged to follow the matrix-line and to swing forward in the direction in which the line advances, substantially as described and shown.

17. In a linotype-machine, the assembling-elevator D, the star-wheel and the spacer-chute as usual, in combination with the line-delivery carriage having the two long fingers, one rigid and the other hinged to swing away from the incoming spacers.

18. In combination, the line-transfer carriage having a finger $e^2$ and a relatively movable finger $e^3$, and means for closing the fingers on the matrix-line controlled by the assembling-elevator D, whereby the rise of the elevator causes the clamping of the line.

19. The carriage having two fingers, movable one toward the other to confine the matrix-line, in combination with a spring tending to draw the fingers together, a latch to hold them apart, and the assembling-elevator arranged to disengage the latch.

20. In a linotype-machine, two line-confining jaws at the casting-point, and the line-transfer carriage and its two movable fingers, $e^2$ and $e^3$, to grasp the matrix-line, in combination with a spring tending to approximate the fingers, means for maintaining their separation during the introduction of the line, means for moving the left finger to confine the line between the fingers, means for advancing the carriage to the left to a constant point, and means for further advancing the two fingers in relation to the carriage until the left end of the line is in alinement with its confining-jaw, whereby the matrix-line is permitted to elongate during justification from the fixed left-hand jaw.

21. In combination with the carriage-frame, the two fingers movable laterally in relation to each other and to the frame, the springs tending to approximate the fingers and move both toward one end of the carriage, and means for shifting the carriage and for shifting, separating and holding the fingers.

22. The carriage-frame, its two sliding fingers, the two springs and the two levers acting respectively to move the carriage and to separate the fingers.

23. In a linotype-machine, the two line-confining jaws in combination with a line-transfer carriage provided with two line-transferring fingers, one adapted to pass freely over the first jaw and aline against the second, and the other arranged to engage and advance the first jaw.

24. In a linotype-machine and in combination with means for assembling the matrices, a laterally-swinging carriage-finger, $e^2$, terminating, in its normal position, immediately above the point at which the matrices and spacers enter the line, whereby it is adapted to aid in guiding them to their places.

In testimony whereof I hereunto set my hand, this 18th day of October, 1904, in the presence of two attesting witnesses.

JOHN R. ROGERS.

Witnesses:
  DAVID S. KENNEDY,
  JOHN PAULSEN.